United States Patent
Sui et al.

(10) Patent No.: US 12,026,910 B2
(45) Date of Patent: Jul. 2, 2024

(54) IMAGE-BASED POSE DETERMINATION METHOD AND APPARATUS, STORAGE MEDIUM, AND ELECTRONIC DEVICE

(71) Applicant: Beijing Horizon Information Technology Co., Ltd., Beijing (CN)

(72) Inventors: Wei Sui, Beijing (CN); Qian Zhang, Beijing (CN); Hongmei Zhu, Beijing (CN)

(73) Assignee: Beijing Horizon Information Technology Co., Ltd., Beijing (CN)

( * ) Notice: Subject to any disclaimer, the term of this patent is extended or adjusted under 35 U.S.C. 154(b) by 357 days.

(21) Appl. No.: 17/540,624

(22) Filed: Dec. 2, 2021

(65) Prior Publication Data
US 2022/0189059 A1    Jun. 16, 2022

(30) Foreign Application Priority Data

Dec. 10, 2020 (CN) .......................... 202011439746.4

(51) Int. Cl.
*G06K 9/00* (2022.01)
*G06T 7/50* (2017.01)
*G06T 7/73* (2017.01)

(52) U.S. Cl.
CPC .............. *G06T 7/74* (2017.01); *G06T 7/50* (2017.01); *G06T 2207/20084* (2013.01); *G06T 2207/30244* (2013.01)

(58) Field of Classification Search
CPC ........................................... G06T 2207/10016
See application file for complete search history.

(56) References Cited

U.S. PATENT DOCUMENTS

| | | | | | |
|---|---|---|---|---|---|
| 11,466,988 | B2 * | 10/2022 | Li | ......... | G05D 1/0246 |
| 11,609,645 | B2 * | 3/2023 | Wan | .......... | G02B 27/0101 |
| 11,790,554 | B2 * | 10/2023 | Woods | .......... | G06F 3/0482 |
| | | | | | 382/103 |
| 2014/0270484 | A1 * | 9/2014 | Chandraker | ...... | G06T 7/246 |
| | | | | | 382/154 |
| 2016/0328601 | A1 * | 11/2016 | Ming | .......... | G06V 40/172 |

(Continued)

*Primary Examiner* — Hadi Akhavannik
(74) *Attorney, Agent, or Firm* — Bret E. Field; Bozicevic, Field & Francis LLP (57) ABSTRACT

Embodiments of the present disclosure disclose an image-based pose determination method and apparatus, a computer readable storage medium, and an electronic device. The method include: acquiring a current image frame captured by a camera disposed on a moving object and a historical image frame captured before the current image frame; determining a first relative camera pose between the current image frame and the historical image frame; determining a virtual binocular image based on the first relative camera pose; and determining current pose information of the camera based on preset visual odometry and the virtual binocular image. According to the embodiments of the present disclosure, the virtual binocular image may be generated based on a monocular image, thus achieving effects of binocular visual odometry without using a binocular camera, thereby reducing costs. Moreover, monocular odometry may be enabled to obtain real physical scale of a space where the moving object is located, thereby improving accuracy of the monocular odometry in determining a position and a pose of the camera.

17 Claims, 5 Drawing Sheets

(56) References Cited

U.S. PATENT DOCUMENTS

| | | | |
|---|---|---|---|
| 2017/0094251 A1* | 3/2017 | Wolke | G06T 7/593 |
| 2017/0316602 A1* | 11/2017 | Smirnov | H04N 13/111 |
| 2019/0332866 A1* | 10/2019 | Beall | G06T 17/30 |
| 2020/0357136 A1* | 11/2020 | Qiao | G06T 7/248 |
| 2022/0189059 A1* | 6/2022 | Sui | G06T 7/70 |

* cited by examiner

IMAGE-BASED POSE DETERMINATION METHOD AND APPARATUS, STORAGE MEDIUM, AND ELECTRONIC DEVICE

FIELD OF THE INVENTION

The present disclosure relates to the technical filed of computers, and in particular, to an image-based pose determination method and apparatus, a computer readable storage medium, and an electronic device.

BACKGROUND OF THE INVENTION

Visual odometry (VO) is a process of estimating motion information of an object merely by using input information of a single camera or a plurality of cameras. Generally, most prior visual odometry requires an additional physical sensor, such as an inertial measurement unit (IMU) or a binocular camera, to obtain scale of a real scene and process rectilinear motion, illumination changes and other situations. In addition, there are also such technical solutions that use a method based on monocular end-to-end learning, to directly regress to a real-scale pose of a moving object through a large amount of data learning samples.

SUMMARY OF THE INVENTION

Embodiments of the present disclosure disclose an image-based pose determination method and apparatus, a computer readable storage medium, and an electronic device.

An embodiment of the present disclosure discloses an image-based pose determination method, where the method include: acquiring a current image frame captured by a camera disposed on a moving object and a historical image frame captured before the current image frame; determining a first relative camera pose between the current image frame and the historical image frame; determining a virtual binocular image based on the first relative camera pose; and determining current pose information of the camera based on preset visual odometry and the virtual binocular image.

According to another aspect of an embodiment of the present disclosure, an image-based pose determination apparatus is provided, where the apparatus include: an acquirement module, configured to acquire a current image frame captured by a camera disposed on a moving object and a historical image frame captured before the current image frame; a first determination module, configured to determine a first relative camera pose between the current image frame and the historical image frame; a second determination module, configured to determine a virtual binocular image based on the first relative camera pose; and a third determination module, configured to determine current pose information of the camera based on preset visual odometry and the virtual binocular image.

According to another aspect of an embodiment of the present disclosure, a computer readable storage medium is provided, in which a computer program is stored, where the computer program is configured, when being executed, for implementing the foregoing image-based pose determination method.

According to another aspect of an embodiment of the present disclosure, an electronic device is provided, where the electronic device includes: a processor; and a memory configured to store a processor-executable instruction, where the processor is configured to read the executable instruction from the memory, and execute the instruction to implement the foregoing image-based pose determination method.

According to the image-based pose determination method and apparatus, the computer readable storage medium, and the electronic device provided in the embodiments of the present disclosure, by acquiring the current image frame and the historical image frame captured by the camera disposed on the moving object, the first relative camera pose between the current image frame and the historical image frame is determined; the virtual binocular image is determined based on the first relative camera pose; and the current pose information of the camera is determined based on the preset visual odometry and the virtual binocular image. In this way, the virtual binocular image is generated based on a monocular image, thus achieving effects of binocular visual odometry without using a binocular camera, thereby reducing costs. Moreover, monocular odometry may be enabled to obtain real physical scale of a space where the moving object is located, thereby improving accuracy of the monocular odometry in determining pose of the camera.

The technical solutions of the present disclosure are further described in detail below with reference to the accompanying drawings and embodiments.

BRIEF DESCRIPTION OF THE DRAWINGS

By describing the embodiments of the present disclosure more detailed with reference to the accompanying drawings, the foregoing and other objectives, features, and advantages of the present disclosure will become more apparent. The accompanying drawings are used to provide further understanding of the embodiments of the present disclosure, constitute a part of the specification, are used to explain the present disclosure together with the embodiments of the present disclosure, and do not constitute limitation to the present disclosure. In the accompanying drawings, same reference numerals generally represent same components or steps.

DETAILED DESCRIPTION OF THE EMBODIMENTS

Exemplary embodiments of the present disclosure are described below in detail with reference to the accompanying drawings. Obviously, the described embodiments are merely a part, rather than all of embodiments of the present disclosure. It should be understood that the present disclosure is not limited by the exemplary embodiments described herein.

It should be noted that, unless otherwise specified, the scope of the present disclosure is not limited by relative arrangement, numeric expressions, and numerical values of components and steps described in these embodiments.

A person skilled in the art may understand that terms such as "first" and "second" in the embodiments of the present disclosure are merely configured to distinguish among different steps, devices, modules, or the like, and indicate neither any particular technical meaning, nor necessarily logical ordering of them.

It should be further understood that, in the embodiments of the present disclosure, the term "multiple/a plurality of" may refer to two or more; and the term "at least one" may refer to one, two, or more.

It should be further understood that, any component, data, or structure involved in the embodiments of the present disclosure may be generally construed to one or more, unless clearly stated or the context indicates otherwise.

In addition, the term "and/or" in the present disclosure refers to only an association relationship that describes associated objects, indicating presence of three relationships. For example, A and/or B may indicate presence of three cases: A alone, both A and B, and B alone. In addition, the character "/" in the present disclosure generally indicates an "or" relationship among associated objects.

It should be further understood that, the descriptions of the various embodiments of the present disclosure focus on differences among the various embodiments. The same or similar parts among the embodiments may refer to one another. For concision, description is not repeated.

Meanwhile, it should be understood that, for ease of description, the accompanying drawings are not necessarily to scale in size of any of parts shown therein.

Descriptions of at least one exemplary embodiment below are actually illustrative only, not construed as any limitation to the present disclosure along with application or use thereof.

Technologies, methods, and devices known by a person of ordinary skills in the related fields may not be discussed in detail herein. However, where appropriate, the technologies, the methods, and the devices shall be regarded as a part of the specification.

It should be noted that, similar reference signs and numericals in the following accompanying drawings indicate similar items. Therefore, once a certain item is defined in one of the accompanying drawings, it is not necessary to further discuss the item in the subsequent accompanying drawings.

The embodiments of the present disclosure may be applicable to a terminal device, a computer system, a server, and other electronic devices, which may be operated together with numerous other general-purpose or special-purpose computing system environments or configurations. Well-known examples of the terminal device, the computing systems, and environment and/or configuration applicable to be used with the terminal device, the computer system, the server, and other electronic devices include but not limited to: a personal computer system, a server computer system, a thin client, a thick client, a handheld or laptop device, a microprocessor-based system, a set-top box, programmable consumer electronics, a network personal computer, a small computer systems, a mainframe computer system, and a distributed cloud computing technology environment including any of the foregoing systems, and the like.

The terminal device, the computer system, the server, and other electronic devices may be described in general context of a computer system-executable instruction (such as a program module) executed by the computer system. Generally, the program module may include a routine, a program, a target program, a component, logic, a data structure, and the like that execute particular tasks or implement particular abstract data types. The computer system/server may be implemented in a distributed cloud computing environment. In the distributed cloud computing environment, a task is performed by a remote processing device linked through a communications network. In the distributed cloud computing environment, the program module may be located on a storage medium of a local or remote computing system including a storage device.

Application Overview

A prior algorithm of positioning an object based on monocular visual odometry has a problem of scale loss, and thus absolute scale of a scene cannot be obtained. In addition, harsh conditions such as linear motion or illumination changes often occur in a real scene. Under these conditions, monocular odometry is prone to positioning failure, and thus it is difficult to achieve accurate and stable effects.

If an additional sensor is added, product costs may be increased, and a process for multi-sensor calibration needs to be introduced. In this case, an overall system becomes more complicated.

A method based on end-to-end learning can only regress to a real-scale pose of an object in a probabilistic sense. According to this method, although pose information can be learned through a supervision signal, and harsh conditions such as linear motion or illumination changes can be processed, accuracy of this method currently yet cannot meet actual requirements.

Exemplary System

Figure 1:
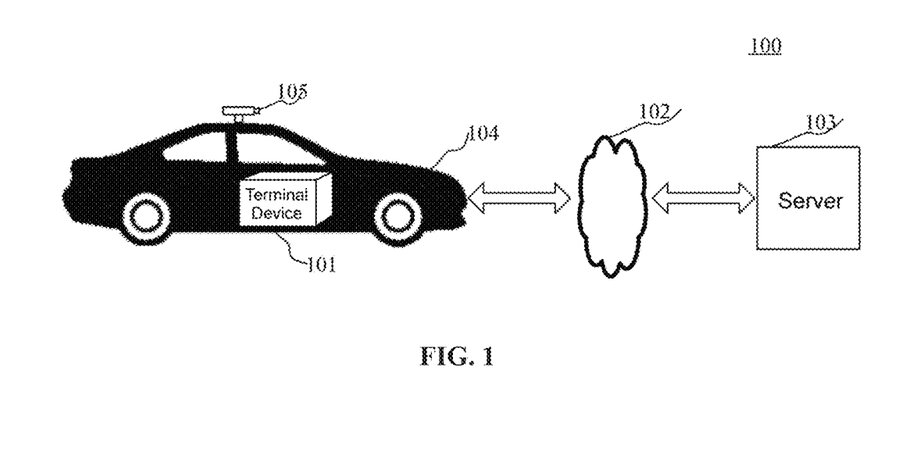
FIG. 1 is a diagram of a system to which the present disclosure is applicable.

FIG. 1 shows an exemplary system architecture 100 of an image-based pose determination method or an image-based pose determination apparatus to which embodiments of the present disclosure may be applicable.

As shown in FIG. 1, the system architecture 100 may include a terminal device 101, a network 102, a server 103, a moving object 104, and a camera 105 disposed on the moving object 104. The network 102 is used as a medium for providing a communication link between the terminal device 101 and the server 103. The network 102 may include various connection types, such as wired and wireless communication links, or fiber optic cables.

A user may use the terminal device 101 to interact with the server 103 through the network 102, to receive or send a message. The terminal device 101 may be installed with various communication client applications, such as a navigation application, an electronic map application, a search application, a web browser application, and an instant messaging tool.

The terminal device 101 is usually disposed on the moving object 104. The terminal device 101 may be any type of electronic device, including but not limited to a mobile terminal such as a mobile phone, a notebook computer, a PAD (a tablet), or a vehicle-mounted terminal (for example, a vehicle navigation terminal).

The moving object 104 may be any type of movable object, such as a car, a drone, or a robot. The moving object 104 shown in FIG. 1 is a car, which is merely an example of the movable object in this embodiment of the present disclosure, and does not limit a range of the moving object.

The server 103 may be a server that provides various services, for example, a background text server that classifies text uploaded by the terminal device 101. The background text server may process the received text, to obtain a processing result (for example, category information).

It should be noted that the image-based pose determination method provided in this embodiment of the present disclosure may be implemented by the server 103, and may also be implemented by the terminal device 101. Correspondingly, the image-based pose determination apparatus may be disposed in the server 103, or may also be disposed in the terminal device 101.

It should be understood that quantities of the terminal device, the network, and the server in FIG. 1 are merely illustrative. According to implementation requirements, there may be any quantity of terminal devices, networks, and servers. When there is no need to remotely obtain an image frame for processing, the foregoing system architecture may include no network, but only include the terminal device 101, the moving object 104, and the camera 105.

Exemplary Method

Figure 2:
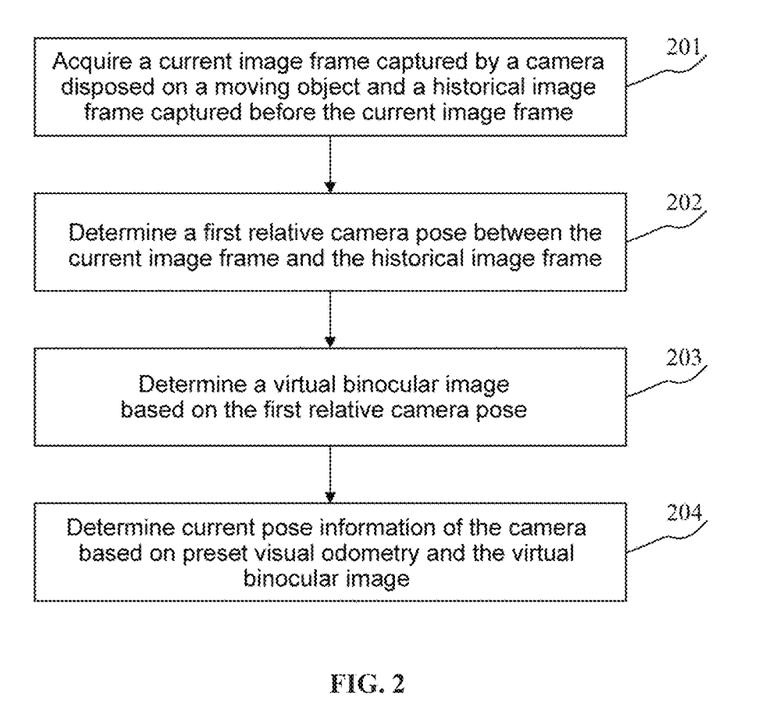
FIG. 2 is a schematic flowchart of an image-based pose determination method according to an exemplary embodiment of the present disclosure.

FIG. 2 is a schematic flowchart of an image-based pose determination method according to an exemplary embodiment of the present disclosure. This embodiment may be applicable to an electronic device (for example, the terminal device 101 or the server 103 shown in FIG. 1). As shown in FIG. 2, the method includes the following steps.

Step 201. Acquire a current image frame captured by a camera disposed on a moving object and a historical image frame captured before the current image frame.

In this embodiment, the electronic device may acquire a current image frame captured by the camera 105 disposed on the moving object 104 shown in FIG. 1 and a historical image frame captured before the current image frame. Generally, the historical image frame is an image frame adjacent to the current image frame or separated from the current image frame by a preset quantity of frames.

Step 202. Determine a first relative camera pose between the current image frame and the historical image frame.

In this embodiment, the first relative camera pose is used to indicate differences in relative positions and capturing angles of the camera when capturing two images. For example, according to a prior method such as feature-point matching, the electronic device may determine a relative pose of the camera when capturing the current image frame and the historical image frame as the first relative camera pose.

Optionally, determining the first relative camera pose between the current image frame and the historical image frame may include:

inputting the current image frame and the historical image frame to a pre-trained first neural network model, to obtain the first relative camera pose between the two neighboring image frames. A first neural network may be acquired through training a prior neural network for pose estimation by using a machine learning method. For example, the first neural network model may be a prior pose detection network (Pose-CNN). The Pose-CNN is a network formed by stacking a plurality of convolutional layers. A relative pose may be acquired by performing arithmetic processing on the two image frames through the pose detection network. The relative pose includes a spatial distance and a capturing-angle difference.

According to this implementation, the relative pose between the current image frame and the historical image frame is determined by using the neural network, so that cases such as blur and illumination changes in an actual scene image may be processed purposefully based on a deep learning mechanism, thereby improving accuracy of pose estimation.

Step 203. Determine a virtual binocular image based on the first relative camera pose.

In this embodiment, the electronic device may determine the virtual binocular image based on the first relative camera pose. Specifically, the current image frame and the historical image frame may be corrected as virtual binocular images based on the first relative camera pose and an intrinsic parameter matrix of the camera.

Step 204. Determine current pose information of the camera based on preset visual odometry and the virtual binocular image.

In this embodiment, the electronic device may determine the current pose information of the camera based on the preset visual odometry and the virtual binocular image. The visual odometry may be a binocular visual odometry, which uses a virtual binocular image, instead of a binocular image captured by a binocular camera. The visual odometry may take the first relative camera pose as an initial value to optimize and adjust the relative camera pose, so as to acquire the current pose information of the camera. The current pose information may represent a coordinate of the camera in a three-dimensional coordinate system and a capturing angle, thereby realizing real-time positioning of the camera.

According to the method provided in the foregoing embodiment of the present disclosure, by acquiring the current image frame and the historical image frame captured by the camera disposed on the moving object, the first relative camera pose between the current image frame and the historical image frame is determined; the virtual binocular image is determined based on the first relative camera pose; and the current pose information of the camera is determined based on the preset visual odometry and the virtual binocular image. In this way, the virtual binocular image is generated based on a monocular image, thus achieving effects of a binocular visual odometry without using the binocular camera, thereby reducing costs. Moreover, monocular odometry may be enabled to obtain real physical scale of a space where the moving object is located, thereby improving accuracy of the monocular odometry in determining the position and the pose of the camera.

Figure 3:
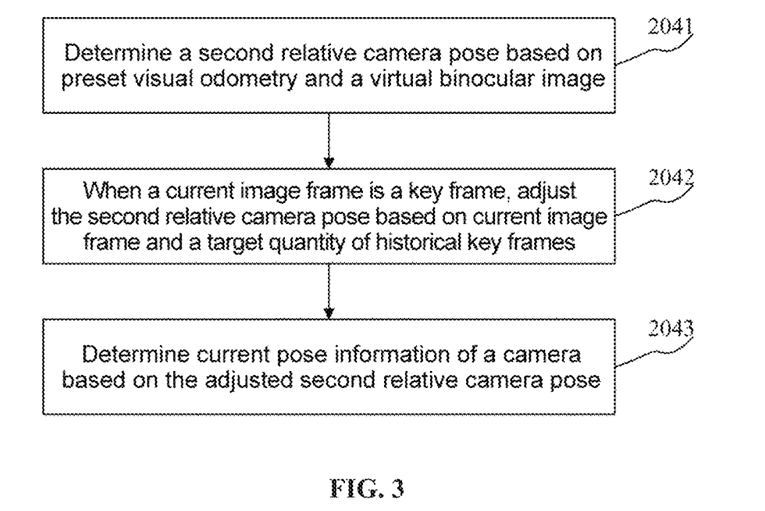
FIG. 3 is a schematic flowchart of an image-based pose determination method according to another exemplary embodiment of the present disclosure.

In some optional implementations, as shown in FIG. 3, step 204 may include the following steps.

Step 2041. Determine a second relative camera pose based on the preset visual odometry and the virtual binocular image.

Specifically, the virtual binocular image may be input to the visual odometry. The visual odometry may take the first relative camera pose as an initial value, and perform pose estimation based on a position of a feature point in the virtual binocular image, so as to optimize and adjust the relative pose to obtain the second relative camera pose.

Step 2042. When the current image frame is a key frame, adjust the second relative camera pose based on the current image frame and a target quantity of historical key frames.

The key frame is a representative frame in an image sequence. Generally, there are a large number of redundant image frames in the image sequence, the redundancy of which is reflected by that most contents of neighboring image frames are similar. By using the key frame, the redundancy may be reduced without losing scene information. Selection of the key frame may be determined through similarity of adjacent image frames. If the similarity is too large (for example, greater than a preset similarity threshold), the adjacent image frames are not determined as key frames. The selection of the key frame may also be determined through a movement status of the camera. If the camera is in a movement status, two adjacent image frames may be considered as key frames. If the camera is stationary, no key frame may be extracted.

The foregoing target quantity of historical key frames may be key frames extracted from image frames before the current image frame based on a preset quantity. Generally, the target quantity is the same as the preset quantity. At an initial capturing stage of the camera, because there is a relatively small quantity of historical image frames, the target quantity is smaller than the preset quantity. For example, the foregoing second relative camera pose may be smoothed based on relative camera poses respectively corresponding to various historical key frames.

Step 2043. Determine current pose information of the camera based on the adjusted second relative camera pose.

The current pose information of the camera is absolute pose information, that is, information about a position in a world coordinate system and information about the capturing angle of the camera.

According to this implementation, when the current image frame is a key frame, a relative camera pose corresponding to the current image frame may be optimized based on the target quantity of historical key frames, so as to obtain more accurate pose information of the camera.

In some optional implementations, the foregoing step 2042 may include the following steps.

First, determine the current image frame and the target quantity of historical key frames as image frames included in a sliding window. For example, the sliding window may include at most seven image frames. As the camera continuously captures new images, new image frames continuously enter into the sliding window, and outdated image frames are removed therefrom.

Subsequently, adjust the second relative camera pose based on pose information respectively corresponding to the target quantity of historical key frames.

Specifically, according to a local nonlinear optimization method of the sliding window, the second relative camera pose may be taken as an initial value, to adjust the second relative camera pose. Local nonlinear optimization is to put visual constraints in a large objective function for optimization. The local optimization herein means that a variable (that is, the pose information) corresponding to the key frame included in only the sliding window is optimized, and a more accurate relative pose is output.

According to this implementation, the second relative camera pose is adjusted by using the sliding window. The relative pose corresponding to the current image frame may be optimized in conjunction with the pose information corresponding to the historical key frames, thereby facilitating to obtain more accurate current pose information of the camera.

In some optional implementations, step 203 may include the following steps.

First, determine baselines of camera positions respectively corresponding to the current image frame and the historical image frame based on the first relative camera pose. The baseline refers to a distance between centers of two cameras, which is generally referred to as a baseline in binocular vision, and herein refers to a distance between positions of the camera at two moments.

Subsequently, determine the virtual binocular image based on a length of the baseline. Specifically, when the length of the baseline is within a preset range, it is indicated that the distance between the positions of the cameras at two moments is relatively reasonable (being not too long or too short). In this case, a relatively accurate camera position and pose may be determined. Subsequently, the current image frame and the historical image frame may be corrected as virtual binocular images based on the first relative camera pose and the intrinsic parameter matrix of the camera.

According to this implementation, by determining the length of the baseline, the current image frame and the historical image frame may be acquired more reasonably, so that the finally determined pose information of the camera is more accurate.

Figure 4:
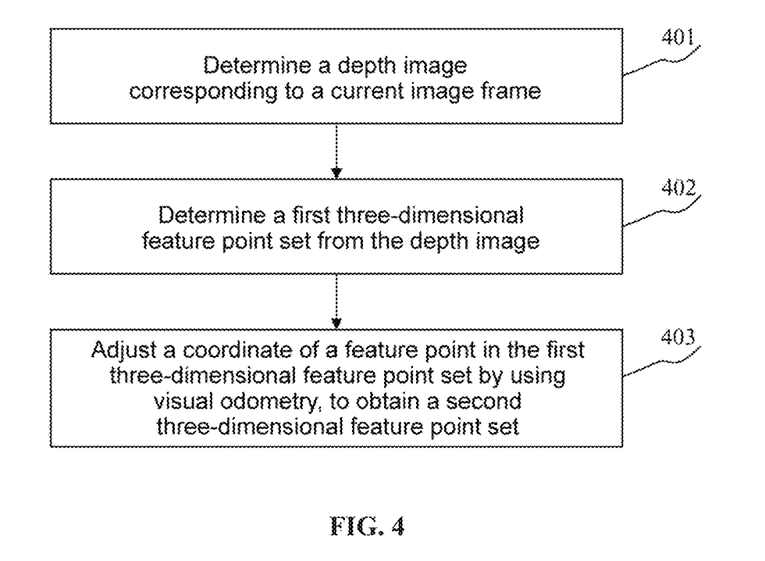
FIG. 4 is a schematic flowchart of an image-based pose determination method according to still another exemplary embodiment of the present disclosure.

Further, referring to FIG. 4, FIG. 4 is schematic flowchart of an image-based pose determination method according to still another embodiment. As shown in FIG. 4, the method may further include the following steps.

Step 401. Determine a depth image corresponding to the current image frame.

Each pixel in the depth image corresponds to a distance value, and the distance value is used to represent a distance between an actual spatial point indicated by the pixel and the camera. In this embodiment, a prior depth image determining method may be used to determine the depth image corresponding to the current image frame.

Optionally, the electronic device may input the current image frame into a pre-trained second neural network model, to obtain the depth image. The second neural network may be acquired by training a prior neural network for determining a depth image by using a machine learning method. For example, the second neural network may be a depth convolutional neural network (Depth-CNN) for depth estimation. The depth convolutional neural network is a network similar to a dense prediction network (Unet) structure, and inputs the current image frame and outputs the corresponding depth image. It should be noted that the second neural network along with the foregoing first neural network may form a large neural network. In other words, the first neural network and the second neural network are sub-networks of the large neural network.

According to this implementation, the depth image is determined by using a neural network. In this way, a model suitable for changes (such as lighting changes and motion blur) in an actual scene is trained based on the deep learning mechanism, and accuracy of generating the depth image is improved without using a binocular image to perform depth estimation, thereby simplifying a depth image generation process and improving efficiency of the depth image generation process.

Step 402. Determine a first three-dimensional feature point set from the depth image.

A three-dimensional feature point in the depth image may also be referred to as a sparse point or a point cloud. A prior method (which is, for example, based on internal parameters of the camera) for converting a point in an image into a point in a three-dimensional coordinate system may be used to convert a point set in the depth image into the first three-dimensional feature point set.

Step 403. Adjust a coordinate of a feature point in the first three-dimensional feature point set by using the visual odometry, to obtain a second three-dimensional feature point set.

The visual odometry may take the first three-dimensional feature point set as an initial value to optimize and adjust a coordinate of the three-dimensional feature point, so as to obtain the second three-dimensional feature point set.

According to the method provided in the foregoing embodiment corresponding to FIG. 4, a position of the capturing target of the camera may be determined more accurately by means of determining the pose information of the camera while generating the depth image and using the visual odometry to optimize the coordinate of the three-dimensional feature point. In this way, it is facilitated to further construct a three-dimensional map and other scenes by using the coordinate of the three-dimensional feature point, and improve accuracy of three-dimensional map construction.

In some optional implementations, when the current image frame is a key frame, a coordinate of a feature point included in the second three-dimensional feature point set is adjusted based on the current image frame and the target quantity of historical key frames, to obtain a third three-dimensional feature point set corresponding to the current image frame. For the description of the key frame, reference may be made to the method described in the foregoing embodiment corresponding to FIG. 3, and details are not described herein again.

For example, the coordinate of the feature point included in the foregoing second three-dimensional feature point set may be smoothed based on three-dimensional feature point sets respectively corresponding to various historical key frames.

According to this implementation, when the current image frame is a key frame, a relative camera pose corresponding to the current image frame may be optimized based on the target quantity of historical key frames, so as to obtain more accurate pose information of the camera.

In some optional implementations, the electronic device may adjust the coordinate of the feature point included in the second three-dimensional feature point set according to the following steps.

First, determine the current image frame and the target quantity of historical key frames as image frames included in a sliding window. For example, the sliding window may include at most seven image frames. As the camera continuously captures new images, new image frames continuously enter into the sliding window, and outdated image frames are removed therefrom.

Subsequently, adjust the coordinate of the feature point included in the second three-dimensional feature point set based on three-dimensional feature point sets respectively corresponding to the target quantity of historical key frames, to obtain the third three-dimensional feature point set corresponding to the current image frame.

Specifically, according to a local nonlinear optimization method of the sliding window, the second three-dimensional feature point set may be taken as an initial value, to adjust the coordinate of the feature point included in the second three-dimensional feature point set. Local nonlinear optimization is to put visual constraints in a large objective function for optimization. The local optimization herein means that a variable (that is, a three-dimensional feature point set) corresponding to the key frame included in only the sliding window is optimized, and a more accurate three-dimensional feature point set is output.

According to this implementation, the coordinate of the feature point included in the second three-dimensional feature point set is adjusted by using the sliding window. The three-dimensional feature point set corresponding to the current image frame may be optimized in conjunction with the three-dimensional feature point set corresponding to the historical key frame, thereby facilitating to obtain a more accurate three-dimensional feature point set.

Exemplary Apparatus

Figure 5:
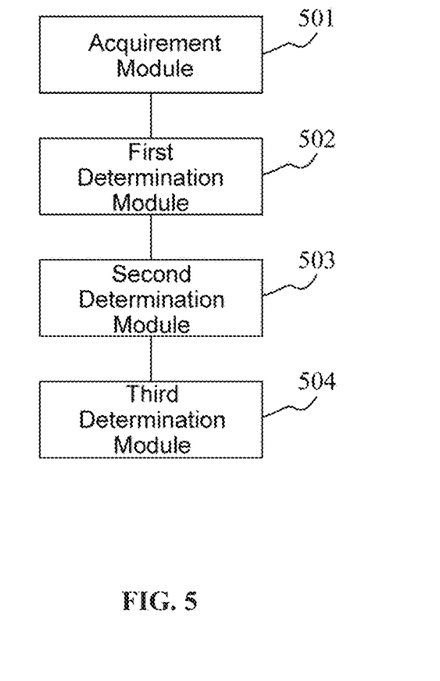
FIG. 5 is a schematic structural diagram of an image-based pose determination apparatus according to an exemplary embodiment of the present disclosure.

FIG. 5 is a schematic structural diagram of an image-based pose determination apparatus according to an exemplary embodiment of the present disclosure. This embodiment may be applicable to an electronic device. As shown in FIG. 5, the image-based pose determination apparatus includes: an acquirement module 501, configured to acquire a current image frame captured by a camera disposed on a moving object and a historical image frame captured before the current image frame; a first determination module 502, configured to determine a first relative camera pose between the current image frame and the historical image frame; a second determination module 503, configured to determine a virtual binocular image based on the first relative camera pose; and a third determination module 504, configured to determine current pose information of the camera based on preset visual odometry and the virtual binocular image.

In this embodiment, the acquirement module 501 may acquire a current image frame captured by the camera 105 disposed on the moving object 104 shown in FIG. 1 and a historical image frame captured before the current image frame. Generally, the historical image frame is an image frame adjacent to the current image frame or separated from the current image frame by a preset quantity of frames.

In this embodiment, the first determination module 502 may determine the first relative camera pose between the current image frame and the historical image frame. The first relative camera pose is used to indicate differences in relative positions and capturing angles of the camera when capturing two images. For example, according to a prior method such as feature-point matching, the first determination module 502 may determine a relative pose of the camera when capturing the current image frame and the historical image frame as the first relative camera pose.

In this embodiment, the second determination module 503 may determine the virtual binocular image based on the first relative camera pose. Specifically, the current image frame and the historical image frame may be corrected as virtual binocular images based on the first relative camera pose and an intrinsic parameter matrix of the camera.

In this embodiment, the third determination module 504 may determine the current pose information of the camera based on the preset visual odometry and the virtual binocular image. The visual odometry may be a binocular visual odometry, which uses a virtual binocular image, instead of a binocular image captured by a binocular camera. The visual odometry may take the first relative camera pose as an initial value to optimize and adjust the relative camera pose, so as to acquire the current pose information of the camera. The current pose information may represent a coordinate in a certain three-dimensional coordinate system and a capturing angle of the camera, thereby realizing real-time positioning of the camera.

Figure 6:
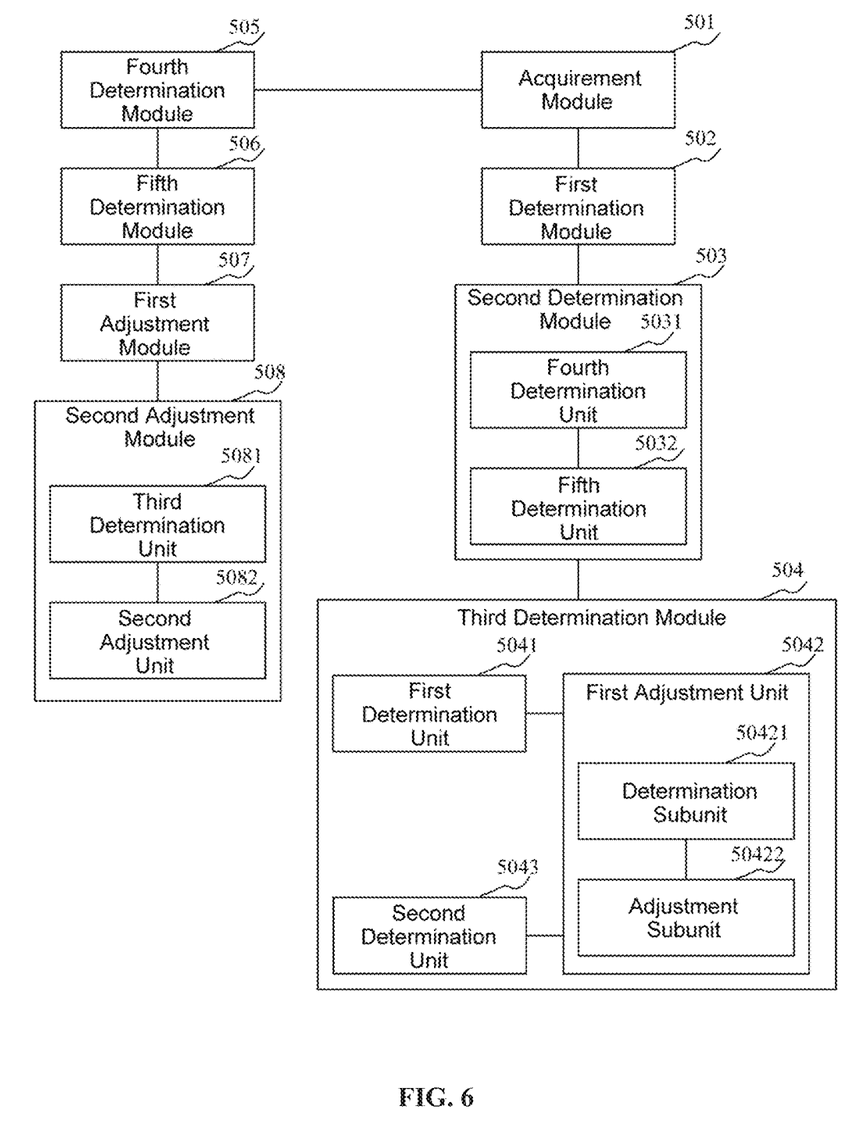
FIG. 6 is a schematic structural diagram of an image-based pose determination apparatus according to another exemplary embodiment of the present disclosure.

Referring to FIG. 6, FIG. 6 is a schematic structural diagram of an image-based pose determination apparatus according to another exemplary embodiment of the present disclosure.

In some optional implementations, the third determination module 504 may include: a first determination unit 5041, configured to determine a second relative camera pose based on the preset visual odometry and the virtual binocular image; a first adjustment unit 5042, configured to adjust the second relative camera pose based on the current image frame and a target quantity of historical key frames when the current image frame is a key frame; and a second determination unit 5043, configured to determine the current pose information of the camera based on the adjusted second relative camera pose.

In some optional implementations, the first adjustment unit 5042 may include: a determination subunit 50421, configured to determine the current image frame and the target quantity of historical key frames as image frames included in a sliding window; and an adjustment subunit 50422, configured to adjust the second relative camera pose based on pose information respectively corresponding to the target quantity of historical key frames.

In some optional implementations, the first determination module 502 may be further configured to: input the current image frame and the historical image frame to a pre-trained first neural network model, to obtain the first relative camera pose between the two neighboring image frames.

In some optional implementations, the apparatus may further include: a fourth determination module 505, configured to determine a depth image corresponding to the current image frame; a fifth determination module 506, configured to determine a first three-dimensional feature point set from the depth image; and a first adjustment module 507, configured to adjust a coordinate of a feature point in the first three-dimensional feature point set by using the visual odometry, to obtain a second three-dimensional feature point set.

In some optional implementations, the fourth determination module 505 may be further configured to: input the current image frame into a pre-trained second neural network model, to obtain the depth image.

In some optional implementations, the apparatus may further include: a second adjustment module 508, configured to adjust, when the current image frame is a key frame, a coordinate of a feature point included in the second three-dimensional feature point set based on the current image frame and the target quantity of historical key frames, to obtain a third three-dimensional feature point set corresponding to the current image frame.

In some optional implementations, the second adjustment module 508 may include: a third determination unit 5081, configured to determine the current image frame and the target quantity of historical key frames as image frames included in a sliding window; and a second adjustment unit 5082, configured to adjust the coordinate of the feature point included in the second three-dimensional feature point set based on three-dimensional feature point sets respectively corresponding to the target quantity of historical key frames, to obtain the third three-dimensional feature point set corresponding to the current image frame.

In some optional implementations, the second determination module 503 may include: a fourth determination unit 5031, configured to determine baselines of camera positions respectively corresponding to the current image frame and the historical image frame based on the first relative camera pose; and a fifth determination unit 5032, configured to determine the virtual binocular image based on a length of the baseline.

According to the image-based pose determination apparatus provided in the foregoing embodiments of the present disclosure, by acquiring the current image frame and the historical image frame captured by the camera disposed on the moving object, the first relative camera pose between the current image frame and the historical image frame is determined; the virtual binocular image is determined based on the first relative camera pose; and the current pose information of the camera is determined based on the preset visual odometry and the virtual binocular image. In this way, the virtual binocular image is generated based on a monocular image, thus achieving effects of binocular visual odometry without using a binocular camera, thereby reducing costs. Moreover, monocular odometry may be enabled to obtain real physical scale of a space where the moving object is located, thereby improving accuracy of the monocular odometry in determining a position and a pose of the camera.

Exemplary Electronic Device

An electronic device according to an embodiment of the present disclosure is described below with reference to FIG. 7. The electronic device may be any one or two of the terminal device 101 and the server 103 shown in FIG. 1, or a stand-alone device independent from the terminal device 101 and the server 103. The stand-alone device may communicate with the terminal device 101 and the server 103, to receive an acquired input signal therefrom.

Figure 7:
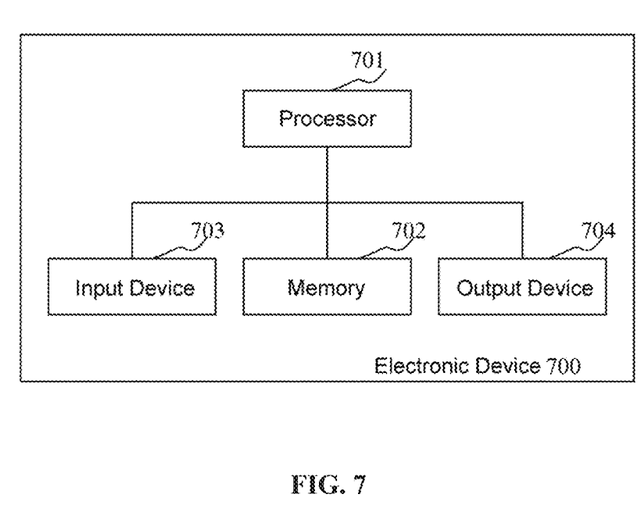
FIG. 7 is a structural diagram of an electronic device according to an exemplary embodiment of the present disclosure.

FIG. 7 is a block diagram of an electronic device according to an embodiment of the present disclosure.

As shown in FIG. 7, an electronic device 700 includes one or more processors 701 and a memory 702.

The processor 701 may be a central processing unit (CPU) or another form of processing unit having a data processing capability and/or an instruction execution capability, and may control another component in the electronic device 700 to perform a desired function.

The memory 702 may include one or more computer program products. The computer program product may include various forms of computer readable storage media, such as a volatile memory and/or a non-volatile memory. The volatile memory may include, for example, a random access memory (RAM) and/or a cache. The nonvolatile memory may include, for example, a read-only memory (ROM), a hard disk, and a flash memory. One or more computer program instructions may be stored on the computer readable storage medium. The processor 701 may execute the program instruction to implement the image-based pose determination method according to the foregoing various embodiments of the present disclosure and/or other desired functions. Various contents such as images and pose information may also be stored in the computer readable storage medium.

In an example, the electronic device 700 may further include an input device 703 and an output device 704. These components are connected with each other through a bus system and/or another form of connection mechanism (not shown).

For example, when the electronic device is the terminal device 101 or the server 103, the input device 703 may be a device such as a camera for inputting an image frame. When the electronic device is a stand-alone device, the input device 703 may be a communication network connector, and is configured to receive the input image frame from the terminal device 101 and the server 103.

The output device 704 may output various information to the outside, including determined pose information. The output device 704 may include, for example, a display, a loudspeaker, a printer, a communication network, and a remote output device connected by the communication network.

Certainly, for simplicity, FIG. 7 shows only some of components in the electronic device 700 that are related to the present disclosure, and components such as a bus and an input/output interface are omitted. In addition, according to specific application situations, the electronic device 700 may further include any other appropriate components.

Exemplary Computer Program Product and Computer Readable Storage Medium

In addition to the foregoing method and device, the embodiments of the present disclosure may further relate to a computer program product, which includes a computer program instruction. When executing the computer program instruction, the processor is enabled to perform the steps, of the image-based pose determination method according to the embodiments of the present disclosure, that are described in the "exemplary method" part of this specification.

The computer program product may be program code, written with one or any combination of a plurality of programming languages, that is configured to perform the operations in the embodiments of the present disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of the present disclosure may further relate to a computer readable storage medium, which stores a computer program instruction. When executing the computer program instruction, the processor is enabled to perform the steps, of the image-based pose determination method according to the embodiments of the present disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to electricity, magnetism, light, electromagnetism, infrared ray, or a semiconductor system, apparatus or device, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or flash memory) or a flash memory, an optical fiber, a portable compact disk read-only memory (CD-ROM), an optical storage device, a magnetic storage device, or any suitable combination of the above.

Basic principles of the present disclosure are described above in combination with the specific embodiments. However, it should be pointed out that the advantages, superiorities, and effects mentioned in the present disclosure are merely examples but are not for limitation, and it cannot be considered that these advantages, superiorities, and effects are necessary for each embodiment of the present disclosure. In addition, specific details of the above disclosure are merely for examples and for ease of understanding, rather than limitations. The foregoing details do not limit that the present disclosure must be implemented by using the foregoing specific details.

The various embodiments in this specification are all described in a progressive way, and each embodiment focuses on a difference from other embodiments. For same or similar parts among the various embodiments, reference may be made to each other. The system embodiments basically correspond to the method embodiments, and thus are relatively simply described. For related parts, reference may be made to a part of the descriptions of the method embodiments.

The block diagrams of the equipment, the apparatus, the device, and the system involved in the present disclosure are merely exemplary examples and are not intended to require or imply that the equipment, the apparatus, the device, and the system must be connected, arranged, and configured in the manners shown in the block diagrams. It is recognized by a person skilled in the art that, the equipment, the apparatus, the device, and the system may be connected, arranged, and configured in an arbitrary manner. The terms such as "include", "contain", and "have" are open terms that mean "including but not limited to", and may be used interchangeably with "including but not limited to". The terms "or" and "and" used herein refer to the term "and/or", and may be used interchangeably with "and/or', unless the context clearly indicates otherwise. The term "such as" used herein refers to the phrase "such as but not limited to", and may be used interchangeably with "such as but not limited to".

The method and the apparatus in the present disclosure may be implemented in many ways. For example, the method and the apparatus in the present disclosure may be implemented by software, hardware, firmware, or any combination of the software, the hardware, and the firmware. The foregoing sequence of the steps of the method is for illustration only, and the steps of the method in the present disclosure are not limited to the sequence specifically described above, unless otherwise specifically stated in any other manner. In addition, in some embodiments, the present disclosure may also be implemented as programs recorded in a recording medium. These programs include machine-readable instructions for implementing the method according to the present disclosure. Therefore, the present disclosure further relates to a recording medium storing a program for implementing the method according to the present disclosure.

It should be further pointed out that, various components or various steps in the apparatus, the device, and the method of the present disclosure may be disassembled and/or recombined. These disassembled and/or recombined components or steps shall be regarded as equivalent solutions of the present disclosure.

The foregoing description about the disclosed aspects is provided, so that the present disclosure can be arrived at or carried out by any person skilled in the art. Various modifications to these aspects are very obvious to a person skilled in the art. Moreover, general principles defined herein may be applicable to other aspects without departing from the scope of the present disclosure. Therefore, the present disclosure is not intended to be limited to the aspect illustrated herein, but to the widest scope consistent with the principles and novel features disclosed herein.

The foregoing description has been given for illustration and description. In addition, this description is not intended to limit the embodiments of the present disclosure to forms disclosed herein. Although a plurality of exemplary aspects and embodiments have been discussed above, a person skilled in the art may recognize certain variations, modifications, changes, additions, and sub-combinations thereof.

What is claimed is:

1. An image-based pose determination method, including:
acquiring a current image frame captured by a camera disposed on a moving object and a historical image frame captured before the current image frame;

determining a first relative camera pose between the current image frame and the historical image frame, wherein the first relative camera pose is used to indicate differences in relative positions and capturing angles of the camera when capturing two images;

determining a virtual binocular image based on the first relative camera pose; and determining current pose information of the camera based on preset visual odometry and the virtual binocular image, wherein the determining a virtual binocular image based on the first relative camera pose includes:

determining baselines of camera positions respectively corresponding to the current image frame and the historical image frame based on the first relative camera pose, wherein the baseline refers to a distance between positions of the camera at two moments; and determining the virtual binocular image based on a length of the baseline, wherein the determining the virtual binocular image based on a length of the baseline includes:

when the length of the baseline is within a preset range, determining a relatively accurate camera position and pose of the camera; and then, correcting the current image frame and the historical image frame as virtual binocular images based on the first relative camera pose and an intrinsic parameter matrix of the camera.

2. The method according to claim 1, wherein the determining current pose information of the camera based on preset visual odometry and the virtual binocular image includes:

determining a second relative camera pose based on the preset visual odometry and the virtual binocular image;

when the current image frame is a key frame, adjusting the second relative camera pose based on the current image frame and a target quantity of historical key frames; and determining the current pose information of the camera based on the adjusted second relative camera pose.

3. The method according to claim 2, wherein the adjusting the second relative camera pose based on the current image frame and a target quantity of historical key frames includes:

determining the current image frame and the target quantity of historical key frames as image frames included in a sliding window; and adjusting the second relative camera pose based on pose information respectively corresponding to the target quantity of historical key frames.

4. The method according to claim 1, wherein the determining a first relative camera pose between the current image frame and the historical image frame includes:

inputting the current image frame and the historical image frame to a pre-trained first neural network model, to obtain the first relative camera pose between the two neighboring image frames.

5. The method according to claim 1, wherein the method further includes:

determining a depth image corresponding to the current image frame;

determining a first three-dimensional feature point set from the depth image; and adjusting a coordinate of a feature point in the first three-dimensional feature point set by using the visual odometry, to obtain a second three-dimensional feature point set.

6. The method according to claim 5, wherein the method further includes:

when the current image frame is a key frame, adjusting a coordinate of a feature point included in the second three-dimensional feature point set based on the current image frame and the target quantity of historical key frames, to obtain a third three-dimensional feature point set corresponding to the current image frame.

7. A non-transitory computer readable storage medium, in which a computer program is stored, wherein the computer program is configured, when being executed, for implementing an image-based pose determination method, wherein the method includes:

acquiring a current image frame captured by a camera disposed on a moving object and a historical image frame captured before the current image frame;

determining a first relative camera pose between the current image frame and the historical image frame, wherein the first relative camera pose is used to indicate differences in relative positions and capturing angles of the camera when capturing two images;

determining a virtual binocular image based on the first relative camera pose; and determining current pose information of the camera based on preset visual odometry and the virtual binocular image, wherein the determining a virtual binocular image based on the first relative camera pose includes:

determining baselines of camera positions respectively corresponding to the current image frame and the historical image frame based on the first relative camera pose, wherein the baseline refers to a distance between positions of the camera at two moments; and determining the virtual binocular image based on a length of the baseline, wherein the determining the virtual binocular image based on a length of the baseline includes:

when the length of the baseline is within a preset range, determining a relatively accurate camera position and pose of the camera; and then, correcting the current image frame and the historical image frame as virtual binocular images based on the first relative camera pose and an intrinsic parameter matrix of the camera.

8. The non-transitory computer readable storage medium according to claim 7, wherein the determining current pose information of the camera based on preset visual odometry and the virtual binocular image includes:

determining a second relative camera pose based on the preset visual odometry and the virtual binocular image;

when the current image frame is a key frame, adjusting the second relative camera pose based on the current image frame and a target quantity of historical key frames; and determining the current pose information of the camera based on the adjusted second relative camera pose.

9. The non-transitory computer readable storage medium according to claim 8, wherein the adjusting the second relative camera pose based on the current image frame and a target quantity of historical key frames includes:

determining the current image frame and the target quantity of historical key frames as image frames included in a sliding window; and adjusting the second relative camera pose based on pose information respectively corresponding to the target quantity of historical key frames.

10. The non-transitory computer readable storage medium according to claim 7, wherein the determining a first relative camera pose between the current image frame and the historical image frame includes:
  inputting the current image frame and the historical image frame to a pre-trained first neural network model, to obtain the first relative camera pose between the two neighboring image frames.

11. The non-transitory computer readable storage medium according to claim 7, wherein the method further includes:
  determining a depth image corresponding to the current image frame;
  determining a first three-dimensional feature point set from the depth image; and
  adjusting a coordinate of a feature point in the first three-dimensional feature point set by using the visual odometry, to obtain a second three-dimensional feature point set.

12. The non-transitory computer readable storage medium according to claim 11, wherein the method further includes:
  when the current image frame is a key frame, adjusting a coordinate of a feature point included in the second three-dimensional feature point set based on the current image frame and the target quantity of historical key frames, to obtain a third three-dimensional feature point set corresponding to the current image frame.

13. An electronic device, including:
  a processor; and
  a memory, configured to store a processor-executable instruction, wherein
  the processor is configured to read the executable instruction from the memory, and execute the instruction to implement an image-based pose determination method, wherein the method includes:
  acquiring a current image frame captured by a camera disposed on a moving object and a historical image frame captured before the current image frame;
  determining a first relative camera pose between the current image frame and the historical image frame, wherein the first relative camera pose is used to indicate differences in relative positions and capturing angles of the camera when capturing two images;
  determining a virtual binocular image based on the first relative camera pose; and
  determining current pose information of the camera based on preset visual odometry and the virtual binocular image,
  wherein the determining a virtual binocular image based on the first relative camera pose includes:
  determining baselines of camera positions respectively corresponding to the current image frame and the historical image frame based on the first relative camera pose, wherein the baseline refers to a distance between positions of the camera at two moments; and
  determining the virtual binocular image based on a length of the baseline,
  wherein the determining the virtual binocular image based on a length of the baseline includes:
  when the length of the baseline is within a preset range, determining a relatively accurate camera position and pose of the camera; and then, correcting the current image frame and the historical image frame as virtual binocular images based on the first relative camera pose and an intrinsic parameter matrix of the camera.

14. The electronic device according to claim 13, wherein the determining current pose information of the camera based on preset visual odometry and the virtual binocular image includes:
  determining a second relative camera pose based on the preset visual odometry and the virtual binocular image;
  when the current image frame is a key frame, adjusting the second relative camera pose based on the current image frame and a target quantity of historical key frames; and
  determining the current pose information of the camera based on the adjusted second relative camera pose.

15. The electronic device according to claim 14, wherein the adjusting the second relative camera pose based on the current image frame and a target quantity of historical key frames includes:
  determining the current image frame and the target quantity of historical key frames as image frames included in a sliding window; and
  adjusting the second relative camera pose based on pose information respectively corresponding to the target quantity of historical key frames.

16. The electronic device according to claim 13, wherein the determining a first relative camera pose between the current image frame and the historical image frame includes:
  inputting the current image frame and the historical image frame to a pre-trained first neural network model, to obtain the first relative camera pose between the two neighboring image frames.

17. The electronic device according to claim 13, wherein the method further includes:
  determining a depth image corresponding to the current image frame;
  determining a first three-dimensional feature point set from the depth image; and
  adjusting a coordinate of a feature point in the first three-dimensional feature point set by using the visual odometry, to obtain a second three-dimensional feature point set.

* * * * *